United States Patent Office 3,097,199
Patented July 9, 1963

3,097,199
PROCESS FOR THE PREPARATION OF 5α,6α-DIFLUORO STEROIDS
Albert Bowers, Mexico City, Mexico, assignor, by mesne assignments, to Syntex Corporation, a corporation of Panama
No Drawing. Filed Jan. 19, 1961, Ser. No. 83,630
Claims priority, application Mexico Jan. 19, 1960
26 Claims. (Cl. 260—235.55)

The present invention relates to a novel method for the production of fluorinated steroids of the androstane and pregnane series and to certain novel compounds so prepared.

More particularly the present invention relates to a novel process for the production of 6α-fluoro steroids of the androstane and pregnane series from the corresponding 5α,6α-difluoro derivatives which are formed by the reaction of a Δ⁵-steroid with a fluorinating agent. The present invention also relates to the novel 5α,6α-difluoro derivatives which are valuable hormones as hereinafter are more fully described.

The production of 6α-fluoro-Δ⁴-3-keto-steroids from Δ⁴-3-keto compounds by prior methods has certain disadvantages. Thus, the known procedures involve shifting the C-4,5 double bond to C-5,6 as by formation of the 3-cycloethyleneketal of the starting compound, formation of the 5,6-oxido-derivatives, separation of the 5α,6α-epoxides from the 5β,6β-isomer, opening of the 5α,6α-oxido derivative with hydrogen fluoride or boron trifluoride etherate, regenerating the 3-keto group, dehydration at C-4,5 to form the C-4,5 double bond and inversion of the steric configuration at C-6.

In accordance with the present method, a Δ⁵-3β-hydroxy compound is treated with hydrogen fluoride and a metallic compound to directly form a 5α,6α-difluoro compound, the 3β-hydroxy group is converted to the 3-keto group and the latter is treated with an acid or base to afford the 6α-fluoro-Δ⁴-3-keto compound. It is apparent the present method of introducing a fluorine atom at C-6 involves fewer steps as compared to the known procedures and hence can be generally achieved at higher yields and lower cost. There has been further provided therefore a novel process involving novel intermediates which per se are useful and valuable hormones.

The novel method of the present invention is illustrated by the following equation insofar as rings A and B are concerned:

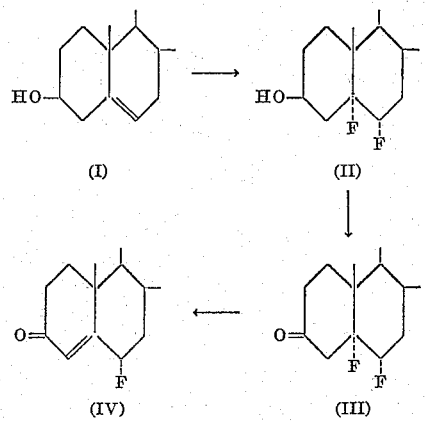

In practicing the process outlined above a Δ⁵-3β-hydroxy steroid (I) dissolved in an inert organic solvent such as methylene dichloride, dioxane or carbon tetrachloride, is added to a mixture of anhydrous hydrogen fluoride and a metallic reagent such as lead tetraacetate, lead dioxide, cobaltic oxide or osmium tetroxide at about −80° C. to form the 3β-hydroxy-5α,6α-difluoro compound (II). The cis addition of fluorine to the C-5, 6 double bond is preferably effected with lead tetraacetate or lead dioxide and hydrogen fluoride and the reaction mixture is stirred at −80° C. for a period of time in the order of 15 minutes. However the reaction may also be conducted for a longer period of time such as for example for one hour at a temperature ranging from −80° C. to −10° C. The thus formed 3β-hydroxy-5α,6α-difluoro compound (II) is oxidized with 8 N chromic acid or chromium trioxide-pyridine complex to afford the corresponding 3-keto-5α,6α-difluoro compound (III) with concomitant oxidation of 11-hydroxy groups, if present, to the 11-keto group. Upon treatment of the latter compound with an acid or a base, preferably by refluxing with sodium acetate in methanol, there is formed the 6α-fluoro-Δ⁴-3-keto compound (IV).

The starting compounds which are particularly suitable for the novel reaction to give useful products are illustrated by the following formulas:

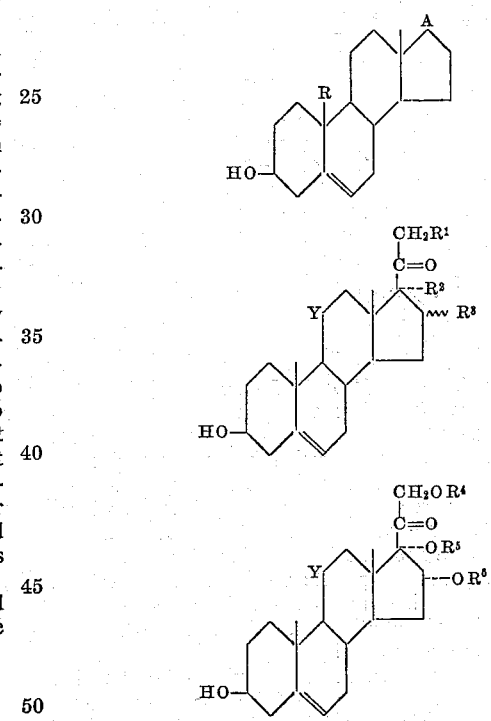

In the above formulas R and R³ represent hydrogen or methyl; R¹ and R² represent hydrogen, hydroxyl or an acyloxy group of a hydrocarbon carboxylic acid of less than 12 carbon atoms; R⁴, R⁵ and R⁶ represent hydrogen or the acyl group of a hydrocarbon carboxylic acid and R₅ and R₆ jointly with the oxygen function may represent the grouping:

in which R⁷ is hydrogen or an aliphatic hydrocarbon radical of less than 8 carbon atoms; Y represents hydrogen, keto or hydroxy; A represents keto or a β-hydroxyl group which may be further substituted in the α-position with a saturated or unsaturated hydrocarbon of less than eight carbon atoms such as methyl, ethyl, propyl, vinyl, butenyl, ethinyl, propinyl and butinyl. The starting compounds may also contain a halogen atom such as chlorine, fluorine or bromine at C-9α.

The novel process therefore leads to the production of the novel 5α,6α-difluoro compounds of the following formulas:

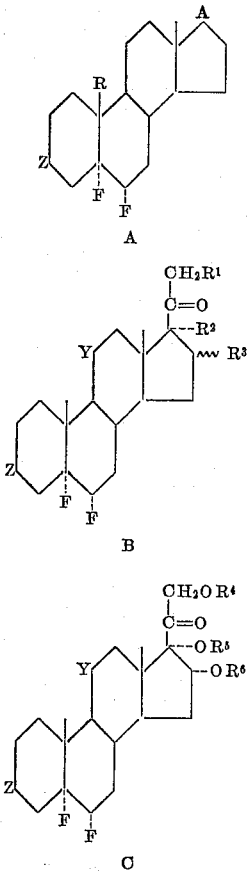

In the above formulas, Y, A, R, R¹ through R⁶ have the same meaning as heretofore set forth and Z represents keto or β-hydroxy.

In addition to being valuable as intermediates for the preparation of the important 6α-fluoro compounds, the above compounds are also valuable hormones. Thus compounds of type A are valuable androgenic-type hormones having a favorable anabolic-androgenic ratio; compounds of type B are potent progestational agents which exhibit anti-estrogenic activity and compounds of type C are pituitary inhibitors in addition to exhibiting anti-estrogenic and anti-gonadotrophic activity.

Typical compounds within the above definitions which may be subjected to the novel reaction are Δ⁵-androsten-3β-ol-17-one, Δ⁵-androstene-3β,17β-diol, 17α-methyl-Δ⁵-androstene-3β,17β-diol, 17α-ethyl-Δ⁵-androstene-3β,17β-diol, 17α-ethinyl-Δ⁵-androstene-3β,17β-diol, the 19-nor-derivatives thereof, Δ⁵-pregnene-3β-ol-20-one, the 17-acylates of Δ⁵-pregnene-3β,17α-diol-20-one, 16(α or β)-methyl-Δ⁵-pregnen-3β-ol-20-one, 16(α or β)-methyl-Δ⁵-pregnene-3β,11α-diol-20-one, the 17-acylates of 16(α or β)-methyl-Δ⁵-pregnen-3β,17α-diol-20-one, the 17-acylates of 16(α or β)-methyl-Δ⁵-pregnen-3β,11α,17α-triol-20-one, the 17-acylates of Δ⁵-pregnene-3β,11α,17α-triol-20-one, the 21-acetate of Δ⁵-pregnene-3β,11α,17α,21-tetrol-20-one, the 21-acetate of Δ⁵-pregnene-3β,17α,21-triol-20-one, the 21-acetate of the 16,17-acetonide of Δ⁵-pregnen-3β,16α,17α,21-tetrol-20-one.

There are thus prepared by the novel method of the present invention the corresponding 5α,6α-difluoro derivatives of androstan-3β-ol-17-one, androstane-3β,17β-diol, 17α-methyl-androstane-3β,17β-diol, 17α-ethyl-androstane-3β,17β-diol, 17α-ethinyl-androstane-3β,17β-diol, the 19-nor derivatives thereof, pregnan-3β-ol-20-one, the 17-acylates of pregnane-3β,17α-diol-20-one and of pregnan-17α-ol-3, of 16(α or β)-methyl-Δ⁵-pregnen-3β,11α,17α-triol-20-20-dione; 16(α or β)-methyl-pregnan-3β-ol-20-one and 16(α or β)methyl-pregnane-3,20-dione; 16(α or β)methyl-pregnane-3β,11α-diol-20-one and 16(α or β)-methyl-pregnane-3,11,20-trione; 16(α or β)-methyl-17α-acyloxy-pregnan-3β-ol-20-one and 16(α or β)-methyl-17α-acyloxy-pregnane-3,20-dione; 16(α or β)-methyl-17α-acyloxy-pregnane-3β,11α-diol-20-one and 16(α or β)-methyl-17α-acyloxy-pregnane-3,11,20-trione; 17α-acyloxy-pregnane-3β,11α-diol-20-one and 17α-acyloxy-pregnane-3,11,20-trione; the 21-acetate of pregnane-3β,11α,17α,21-tetrol-20-one and of pregnan-17α-ol-3,11,20-trione; the 21-acetate of pregnane-3β,17α,21-triol-20-one and of pregnane-17α,21-diol-3,20-dione; the 21-acetate of the 16,17-acetonide of pregnane-3β,16α,17α,21-tetrol-20-one and of pregnane-16α,17α,21-triol-3,20-dione.

Although 3β-hydroxy-Δ⁵-steroids are preferred starting materials it is apparent that other 3-oxygenated Δ⁵-steroids are suitable in the novel reaction. Thus, 3β-acylates, 3-enol esters, 3-enol ethers and 3-cyclic alkylene ketals may also serve as starting compounds for the preparation of the 5α,6α-difluoro-derivatives.

The following specific examples serve to illustrate but are not intended to limit the scope of the invention.

*Example I*

A solution of 5 g. of Δ⁵-pregnen-3β-ol-20-one in 100 ml. of methylene chloride was added with stirring over 15 minutes to a mixture of 10 g. of lead tetraacetate and 20 ml. of anhydrous hydrogen fluoride, cooled in acetone-Dry Ice bath to −80°; the mixture was then stirred at −80° for 15 minutes and at the end of this time cautiously poured into an aqueous ice-cold solution of sodium carbonate, containing an excess of sodium carbonate. The organic phase was separated, the aqueous phase extracted with methylene chloride and the methylene solutions were combined, washed with water until neutral, dried over anhydrous sodium sulfate and evaporated to dryness. Subsequent chromatography on neutral alumina afforded 5α,6α - difluoro - pregnan - 3β - ol - 20 - one, M.P. 221–223° [α]$_D$+88° (CHCl$_3$). This compound exhibited anti-estrogenic activity.

An ice-cold solution of 5 g. of the foregoing compound, in 250 ml. of acetone, was treated with an excess of 8 N chromic acid, with stirring. The 8 N chromic acid was prepared in aqueous dilute sulfuric acid. The temperature was maintained at 0° during the addition. Stirring was then continued for 2 minutes, addition of ice-water gave a precipitate which was water-washed, dried and crystallized from acetone-hexane to afford 5α,6α-difluoro-pregnane-3,20-dione, M.P. 224–226°, [α]$_D$+78° (CHCl$_3$).

A mixture of 5 g. of the foregoing compound, 5 g. of sodium acetate and 150 ml. of methanol was refluxed for 2 hours, then chilled, diluted with water and the solid collected by filtration, water-washed, dried and crystallized from acetone-hexane, furnishing 6α-fluoro-progesterone.

*Example II*

5 g. of 17α-acetoxy-Δ⁵-pregnen-3β-ol-20-one [Ringold et al., J. Am. Chem. Soc., 78, 820 (1956)] were treated with lead tetraacetate and hydrogen fluoride, exactly as described in Example I for the similar reaction with Δ⁵-pregnen-3β-ol-20-one, and 5α,6α-difluoro-17α-acetoxy-pregnan-3β-ol-20-one was obtained. Following the technique described in Example I, the foregoing compound was oxidized with 8 N chromic acid to afford 5α,6α-difluoro-17α-acetoxy-pregnane-3,20-dione and this compound, in its turn was refluxed with sodium acetate in methanol. Thus 6α-fluoro-17α-acetoxy-progesterone was obtained.

*Example III*

The fluorinating procedure of Example I was repeated but using lead dioxide instead of lead tetraacetate. 5α,6α-difluoro-pregnan-3β-ol-20-one was obtained, identical with the compound prepared by the use of lead tetraacetate.

Example IV

A mixture of 1 g. of Δ⁵-pregnene-3β,17α-diol-20-one [Ringold et al., J. Am. Chem. Soc., 78, 820 (1956)], 50 ml. of dry benzene, 2 ml. of propionic anhydride and 0.5 g. of p-toluenesulfonic acid monohydrate was left at room temperature overnight, then water-washed, dried over anhydrous sodium sulfate and evaporated to dryness. The residue was treated with 50 ml. of 1% methanolic potassium hydroxide, under an atmosphere of nitrogen, at 5° for 2 hours. After acidifying with acetic acid, the volume was reduced to about 20 ml. in vacuo. Water was then added, the precipitate collected by filtration, water-washed, dried and crystallized from acetone-hexane. Thus Δ⁵-pregnene-3β,17α-diol-20-one 17-propionate was obtained which in its turn, was submitted to the reaction described in Example I. There were produced, consecutively: 5α,6α-difluoropregnane-3β,17α-diol-20-one 17-propionate and 5α,6α-difluoropregnan-17α-ol-3,20-dione propionate which exhibited anti-ovulation activity; the latter compound was converted into 6α-fluoro-17α-hydroxy-progesterone propionate as described above.

Example V

By following the method described in Example IV, but using caproic anhydride and cyclopentylpropionic anhydride instead of propionic anhydride, Δ⁵-pregnene-3β,17α-diol-20-one was converted into its 17α-caproate and into its 17α-cyclopentylpropionate, respectively. These compounds were submitted to the reactions described in Example I, and there were obtained in a consecutive manner the 17-caproates and 17-cyclopentylpropionates, respectively of 5α,6α-difluoro-pregnane-3β,17β-diol-20-one, 5α,6α-difluoro-pregnan-17β-ol-3,20-dione and of 6α-fluoro-17α-hydroxy-progesterone.

Example VI

To a solution of 10 g. of 16-methyl-Δ⁵,¹⁶-pregnadien-3β-ol-20-one [(Romo et al., Bol. Inst. Quim. Mex., 4, 125 (1952)] in 700 ml. of methanol were added 20 ml. of 4 N aqueous sodium hydroxide and then 40 ml. of 30% aqueous hydrogen peroxide, while stirring and maintaining the temperature below 15° C. The mixture was left in the refrigerator overnight, then poured into 2750 ml. of ice-water, the solid was collected by filtration, water-washed and dried, affording 16-methyl-16α,17α-oxido-Δ⁵-pregnen-3β-ol-20-one. 10 g. of this compound were suspended in 100 ml. of methylene chloride, the suspension was chilled to 10° C. and 10 ml. of acetic acid, saturated with dry hydrogen bromide, were added, little by little, while stirring and at 15° C. The mixture was then stirred at room temperature for half an hour, at the end of this time it was diluted with ice-water, the organic layer was separated, water-washed, dried over anhydrous sodium sulfate and evaporated to dryness, under reduced pressure. 5 g. of the thus obtained bromohydrin were then refluxed with 10 g. of Raney nickel and 150 ml. of methanol under an atmosphere of nitrogen for 4 hours. At the end of this time, the solid was filtered and the filtrate was concentrated to the point of crystallization. After cooling, the product was collected by filtration, water-washed, dried and chromatographed on silica gel furnishing 16α-methyl-Δ⁵-pregnene-3β,17α-diol-20-one.

The foregoing compound was divided into 5 portions of 1 g. each; 1 g. was submitted to the reactions described in Example I without esterification of the 17α-hydroxy group; the other portions were first converted into the 17-acetate, 17-propionate, 17-caproate and 17-cyclopentylpropionate, respectively of 16α-methyl-Δ⁵-pregnene-3β,17α-diol-20-one by the method described in Example IV and were then subjected to the reactions described in Example I. Thus consecutively were obtained: 5α,6α-difluoro-16α-methyl-pregnane-3β,17α-diol-20-one, 5α,6α-difluoro-16α-methyl-pregnan-17β-ol - 3,20 - dione and 6α-fluoro-16α-methyl-17α-hydroxy-progesterone and the 17-acetates, 17-propionates, 17-caproates and 17-cyclopentylpropionates, respectively, of said compounds. 5α,6α-difluoro-16α-methyl-pregnan-17β-ol-3,20 - dione 17-acetate exhibited progestational activity.

Example VII

A mixture of 10 g. of Δ⁵,¹⁶-pregnadiene-3β,11α-diol 20-one [Halpern and Djerassi; J. Am. Chem. Soc., 81, 439 (1959)], 400 ml. of dry benzene and 5 ml. of 3 N ethereal methylmagnesium bromide was refluxed for 6 hours. At the end of this time the mixture was poured into 1 liter of ice-water containing 40 g. of ammonium chloride, the organic layer was separated, the aqueous phase was extracted with ethyl acetate and the solutions in the organic solvents were cooled, washed with saturated aqueous sodium chloride solution, dried over anhydrous sodium sulfate and evaporated to dryness. Subsequent chromatography, on neutral alumina, furnished 16α-methyl-Δ⁵-pregnene-3β,11α-diol-20-one.

The foregoing compound was submitted to the reactions described in Example I, and thus were obtained, consecutively: 16α - methyl-5α,6α-difluoro-pregnane-3β,11α-diol-20-one; 16α-methyl-5α,6α-difluoro-pregnane-3,11,20-trione; and 6α-fluoro-16α-methyl-11-keto-progesterone.

Example VIII 8 g. of 16α-methyl-Δ⁵-pregnene-3β,11α-diol-20-one, in 30 ml. of pyridine was treated with 8 ml. of acetic anhydride, at room temperature overnight. The mixture was then poured into water; after heating on the steam bath for half an hour and subsequent cooling, the solid was isolated from the liquid by filtration, water-washed, dried and crystallized from acetone-hexane, furnishing 16α-methyl-Δ⁵-pregnene-3β,11α-diol-20-one diacetate.

8 g. of the foregoing compound were dissolved in 100 ml. of chloroform containing a few drops of pyridine, the solution was chilled to 0° C., and then little by little and with stirring, 1.05 molecular equivalents of chlorine dissolved in chloroform were added. The mixture was left at room temperature for about 1 hour, then the excess of chlorine was eliminated by passing through the mixture a current of dry air. Subsequently it was washed with aqueous sodium bicarbonate, dried over anhydrous sodium sulfate and evaporated to dryness. The residue crystallized from ethanol-benzene, affording the diacetate of 16α - methyl - 5α,6β-dichloropregnane-3β,11α-diol-20-one.

From a mixture of 8 g. of the foregoing compound, 3.6 g. of p-toluenesulfonic acid monohydrate and 400 ml. of acetic anhydride, there were distilled 320 ml. in the course of 15 hours. The residue was cooled and poured into ice-water, the product was then extracted with ether and the extract was washed consecutively with 5% aqueous sodium bicarbonate and water, then dried over anhydrous sodium sulfate. Finally, the ether was evaporated and 16α - methyl - 5α,6β - dichloro-Δ¹⁷⁽²⁰⁾-pregnene-3α,11α,20-triol triacetate was obtained.

A mixture of 4 g. of the foregoing compound and 1.2 molecular equivalents of perbenzoic acid in 160 ml. of benzene was left at room temperature overnight, then diluted with water and the organic layer was separated, washed consecutively with aqueous sodium bicarbonate and with water, dried over anhydrous sodium sulfate and finally evaporated to dryness, yielding 16α-methyl-5α,6α-dichloro - 17,20-oxido-pregnane-3β,11α,20-triol triacetate.

The foregoing compound was reacted with 2 liters of 0.5 N sodium hydroxide solution (prepared in equal parts of ethanol and water), at room temperature and for 24 hours. The mixture was then acidified with acetic acid and concentrated to small volume, at reduced pressure. The product was precipitated by addition of ice-water, collected by filtration, water washed, dried and crystallized from methanol acetone, yielding 16α-methyl-5α,6β-dichloro-pregnane-3β,11α,17α-triol-20-one.

1.8 g. of the foregoing compound was dissolved in 180 ml. of 80% acetic acid, at 40° C., maintaining this temperature and while stirring 1.8 g. of zinc dust were added. Stirring was continued at 40° C. for 16 hours, the solid filtered, then water was added to the filtrate and the product extracted with chloroform. The extract was washed consecutively with 5% aqueous sodium bicarbonate and with water, dried over anhydrous sodium sulfate and the chloroform finally evaporated. The residue crystallized from acetone-hexane, furnishing 16α-methyl-Δ$^5$-pregnene-3β,11α,17α-triol-20-one.

The preceding compound was divided into 4 portions of 1 g. each and each portion was treated with acetic anhydride, propionic anhydride, caproic anhydride and cyclopentylpropionic anhydride respectively, in accordance with the methods of Examples IV and V. The ester groups at C-3 and C-11 were selectively hydrolyzed in the 3,11,17-triesterified compound as described in Example IV. Thus the 17-acetate, 17-propionate, 17-caproate and 17-cyclopentylpropionate, respectively, of 16α-methyl - Δ$^5$-pregnene-3β,11α,17α-triol-20-one were obtained.

The foregoing compounds were then reacted exactly as described in Example I and thus there were obtained, consecutively: the 17-acetates, 17-propionates, 17-caproates and 17-cyclopentylpropionates, respectively of 16α-methyl - 5α,6α-difluoro-pregnane-3β,11α,17α-triol-20-one, of 16α-methyl-5α,6α-difluoro-pregnan-17α-ol-3,11,20-trione and of 16α-methyl-6α-fluoro-11-keto-17α-hydroxy-progesterone.

*Example IX*

To a solution of 10 g. of 16α-methyl-Δ$^5$-pregnene-3β,11α-diol-20-one diacetate (prepared in accordance with the procedure of Example VIII) in 120 ml. of acetic acid, were added a few drops of acetic acid saturated with dry hydrogen bromide. A solution of 7.4 g. of bromine in 60 ml. of acetic acid was then added slowly while stirring and maintaining the temperature of the reaction mixture at about 15° C. It was then stirred for an additional half an hour, poured into water and the solid was collected by filtration, water washed and dried in vacuo. The resulting 16α - methyl - 5α,6β,17-tribromo-pregnane-3β,11α-diol-20-one diacetate was dissolved in 1200 ml. of acetone, 60 g. of sodium iodide were added and the mixture was refluxed for 15 hours. It was then concentrated to small volume under reduced pressure, then poured into water and the product was extracted with ether. The extract was washed consecutively with aqueous 10% sodium sulfite and with water, dried over anhydrous sodium sulfate and evaporated to dryness below 35°. The residue, 16α - methyl - 17-bromo-Δ$^5$-pregnene-3β,11α-diol-20-one diacetate was refluxed with 80 ml. of γ-collidine for 1 hour. The collidine hydrobromide was removed by filtration and washed with ether, the combined solutions were diluted with more ether, washed consecutively with dilute hydrochloric acid and with water, dried over anhydrous sodium sulfate and evaporated. The residue was crystallized from acetone to afford 16-methyl-Δ$^{5,16}$-pregnadiene-3β,11α-diol-20-one diacetate.

The foregoing compound was dissolved in 700 ml. of ethyl acetate, 5 g. of Raney nickel were added and the mixture was hydrogenated during 2½ hours, whereby approximately 1 molecular equivalent of hydrogen was absorbed. After removal of the catalyst by filtration, the solvent was evaporated and the residue crystallized from methanol, thus obtaining 16β-methyl-Δ$^5$-pregnene-3β,11α-diol-20-one diacetate.

A mixture of 9 g. of the above compound and 450 ml. of 1% methanolic potassium hydroxide was kept at 40° for 10 hours under an atmosphere of nitrogen with stirring. The mixture was then neutralized by the addition of acetic acid, concentrated to small volume and, finally, poured into ice-water. The solid was collected by filtration, water-washed, dried and crystallized from acetone-hexane. Thus 16β - methyl - Δ$^5$-pregnene-3β,11α-diol-20-one were obtained.

The foregoing compound was submitted to the reactions described in Example I and thus were obtained, consecutively: 16β - methyl-5α,6α-difluoro-pregnane-3β,11α-diol-20-one, 16β-methyl-5α,6α-difluoro-pregnane-3,11,20-trione and 16β-methyl-6α-fluoro-11-keto-progesterone.

*Example X*

By following the method described in Example IX, 16β-methyl-Δ$^5$-pregnene-3β,11α-diol-20-one diacetate was prepared. The 17α-hydroxy group was then introduced, exactly as described for the 17α-hydroxylation of 16α-methyl-Δ$^5$-pregnene-3β,11α-diol-20-one diacetate in Example VIII. By the concomitant hydrolysis of the acetoxy groups, 16β - methyl-Δ$^5$-pregnene-3β,11α,17α-triol-20-one was obtained which was then divided into several 1 g. portions and each portion was esterified selectively at C-17, as described in Example VIII, yielding the 17-acetate, 17-propionate, 17-caproate and 17-cyclopentylpropionate, respectively of 16β-methyl-Δ$^5$-pregnene-3β,11α,17α-triol-20-one.

By application of the reaction sequence described in Example I, there were obtained, consecutively: the 17-acetates, 17-propionates, 17-caproates and 17-cyclopentylpropionates, respectively, of 16β-methyl-5α,6α-difluoro-pregnane-3β,11α,17α-triol-20-one, of 16β-methyl-5α,6α-difluoro-pregnan-17α-ol-3,11,20-trione and of 16β-methyl-11-keto-17α-hydroxy progesterone.

*Example XI*

Exactly as described for the inversion of the methyl group of 16α-methyl-Δ$^5$-pregnene-3β,11α-diol-20-one diacetate in Example IX, 16α-methyl-Δ$^5$-pregnen-3β-ol-20-one acetate [Marker et al., J. Am. Chem. Soc., 64, 1280 (1942)] was converted to 16β-methyl-Δ$^5$-pregnen-3β-ol-20-one. Upon bromination of 16α-methyl-Δ$^5$-pregnen-3β-ol-20-one acetate there was obtained 16α-methyl-5α,6β,17-tribromo-pregnan-3β-ol-20-one acetate; the subsequent treatment with sodium iodide afforded 16α-methyl-17β-bromo-Δ$^5$-pregnen-3β-ol-20-one; the following collidine treatment yielded 16-methyl-Δ$^{5,16}$-pregnadien-3β-ol-20-one; finally by the hydrogenation, 16β-methyl-Δ$^5$-pregnen-3β-ol-20-one acetate was obtained. A conventional alkaline hydrolysis of the 3-acetoxy group afforded the C-3 alcohol.

By application of the reactions described in Example I, from 16β-methyl-Δ$^5$-pregnen-3β-ol-20-one were obtained, consecutively: 16β - methyl-5α,6α-difluoro-pregnan-3β-ol-20 - one, 16β - methyl-5α,6α-difluoro-pregnane-3,20-dione and 16β-methyl-6α-fluoro-progesterone.

*Example XII*

In accordance with the esterification procedures described in Examples IV and V, the acetate, propionate, caproate and cyclopentylpropionate, respectively of Δ$^5$-pregnene-3β,11α,17α-triol-20-one [Halpern and Djerassi, J. Am. Chem. Soc., 81, 439 (1959)] were prepared and submitted to the reactions described in Example I. Thus were obtained, consecutively: the 17-acetate, 17-propionates, 17-caproates and 17-cyclopentylpropionates, respectively, of 5α,6α-difluoro-pregnane-3β,11α,17α-triol, of 5α,6α-difluoropregnan-17α-ol-3,11,20-trione and of 11-keto-17α-hydroxy-progesterone. 5α,6α-difluoro-pregnan-17α-ol-3,11,20-trione was found to inhibit the excretion of the gonadotrophic hormone.

*Example XIII*

5 g. of Δ$^{5,16}$-pregnadiene-3β,11α-diol-20-one [Halpern and Djerassi, J. Am. Chem. Soc., 81, 439 (1959)], in 250 ml. of ethanol were shaken in a hydrogen atmosphere, over 1 g. of 5% palladium charcoal catalyst at room temperature and atmospheric pressure, up to the uptake of about 1 equivalent of hydrogen. Removal of the catalyst followed by recrystallization of the residue from acetone-hexane, furnished Δ$^5$-pregnene-3β,11α-diol-20-one. The reactions described in Example I gave consecutively 5α,6α- difluoro-pregnane-3β,11α-diol-20-one, 5α,6α-difluoro-pregnane-3,11,20-trione and 6α-fluoro-11-keto-progesterone.

Example XIV

In accordance to the procedure mentioned in the foregoing example, $\Delta^{5,16}$-pregnadiene-3β-ol-11,20-dione, the product of the side chain degradation of botogenin [Rothman and Wall, J. Am. Chem. Soc., 81, 411 (1959)], was converted to $\Delta^5$-pregnen-3β-ol-11,20-dione acetate, which was saponified in accordance with the method of Example IX. Treatment with lead tetraacetate and hydrogen fluoride, in accordance with the procedure described in Example I, afforded 5α,6α-difluoro-pregnan-3β-ol-11,20-dione, which was oxidized, also in accordance with the procedure described in Example I, to give 5α,6α-difluoro-pregnane-3,11,20-trione, identical with the intermediate of Example XIII.

Example XV

By the usual treatment with ethyleneglycol in presence of p-toluenesulfonic acid, refluxing in benzene, the 20-cycloethyleneketal of $\Delta^5$-pregnen-3β-ol-11,20-dione (see Example X) was obtained. By also known methods, by reaction with lithium aluminum hydride and subsequent hydrolysis of the ketal group, $\Delta^5$-pregnene-3β,11β-diol-20-one was then obtained; in accordance with the procedure described in Example I, by the reaction with lead tetraacetate and hydrogen fluoride, 5α,6α-difluoro-pregnane-3β,11β-diol-20-one was further produced and oxidized to 5α,6α-difluoro-pregnane-3,11,20-trione, identical with the intermediate Example XIII.

Example XVI 4 g. of $\Delta^5$-pregnene-3β,11α,17α-triol-20-one [Halpern and Djerassi, J. Am. Chem. Soc., 81, 439 (1959)] was dissolved in 50 ml. of chloroform containing 1 ml. of pyridine, the solution was chilled in a Dry Ice-acetone bath and 1.05 molecular equivalents of chlorine in carbon tetrachloride were added. The temperature of the mixture was allowed to rise to room temperature and then a current of nitrogen was passed through the mixture to remove the excess of chlorine. The solution was then washed consecutively with aqueous 2 N hydrochloric acid, water, aqueous 5% sodium bicarbonate and water, dried over anhydrous sodium sulfate and evaporated. The residue crystallized from methanol-benzene, affording 5α,6β-dichloro-pregnane-3β,11α,17α-triol-20-one.

3 g. of the foregoing compound were dissolved in 150 ml. of dioxane and 1.2 g. of bromine, dissolved in 70 ml. of dioxane was added, slowly, with stirring, maintaining the temperature below 15° C. After addition of the bromine stirring was continued for further 5 minutes and then the mixture was poured into aqueous 10% sodium bicarbonate, the product extracted with chloroform, the extract water-washed, dried over anhydrous sodium sulfate and evaporated under reduced pressure. Thus, 5α,6β-dichloro-21-bromo-pregnane-3β,11α,17α-triol-20-one was obtained.

To a solution of 3 g. of the above compound in 120 ml. of dry acetone, 3.9 g. of anhydrous potassium acetate, 1.8 g. of sodium iodide and 1.5 ml. of glacial acetic acid were added, and the mixture was refluxed for 9 hours. At the end of this time it was poured into water, the product was extracted with chloroform, the extract was washed with water, dried over anhydrous sodium sulfate and evaporated. The residue crystallized from acetone-hexane furnishing 5α,6β-dichloro-pregnane-3β,11α,17α,21-tetrol-20-one 21-acetate.

To a solution of 5 g. of the foregoing compound, in 500 ml. of glacial acetic acid, 5 g. of zinc-dust was added, little by little, while stirring. The temperature was then slowly raised to 40° C. and this temperature maintained in further half an hour with continuous stirring. From the cooled mixture the zinc was removed by filtration, the residue was washed with acetone, and the cooled solutions were evaporated to dryness. The residue crystallized from aqueous methanol, furnishing $\Delta^5$-pregnene-3β,11α,17α,21-tetrol-20-one 21-acetate.

By following the method described in Example I the above compound was converted into 5α,6α-difluoro-pregnane-3β,11α,17α,21-tetrol-20-one 21-acetate.

An ice-cold solution of 5 g. of the foregoing compound in 250 ml. of acetone was treated with an excess of 8 N chromic acid, with stirring. The 8 N chromic acid was prepared in aqueous dilute sulfuric acid. The temperature was maintained at 0° during the addition. Stirring was then continued for 2 minutes more, the mixture was poured into ice-water and the solid was collected by filtration, water-washed, dried and crystallized from acetone-hexane. Thus 5α,6α-difluoro-pregnane-17α,21-diol-3,11,20-trione 21-acetate was obtained.

A mixture of 5 g. of the foregoing compound, 5 g. of sodium acetate and 150 ml. of methanol was refluxed for 2 hours, then cooled, diluted with ice-water up to complete precipitation of the product, which was collected by filtration, water-washed, dried and crystallized from acetone-hexane. Thus 6α-fluoro-cortisone 21-acetate was obtained.

Example XVII $\Delta^5$-pregnene-3β,17α,21-triol-20-one [Fuchs and Reichstein, Helv. Ch. Acta, 24, 401 (1941)] was acetylated selectively at C-21 by treatment with 1.1 molecular equivalent of acetic anhydride in pyridine overnight, and then treated with lead tetraacetate and hydrogen fluoride, following the technique described in Example I. Thus, 5α,6α-difluoro-pregnene-3β,17α,21-triol-20-one 21-acetate was obtained, which in turn was oxidized with 8 N chromic acid to 5α,6α-difluoro-pregnane-17α,21-diol-3,20-dione 21-acetate. Subsequent treatment with sodium acetate in methanol under reflux gave 6α-fluoro-$\Delta^4$-pregnene-17α,21-diol-3,20-dione 21-acetate. The oxidation step with 8 N chromic acid and the treatment with sodium acetate were effected exactly as described in Example I.

Example XVIII

The procedure of Example XVI was repeated with lead dioxide instead of lead tetraacetate, and 5α,6α-difluoro-pregnane-3β,11α,17α,21-tetrol-20-one 21-acetate was obtained identical with the product obtained in Example XVI.

Example XIX

A suspension of 3 g. of 16α,17α-isopropylidenedioxy-$\Delta^5$-pregnene-3β,21-diol-20-one diacetate (Petrow et al., J. Chem. Soc., 1955, 4383) in 30 cc. of methanol was cooled to 0° C. and treated under nitrogen atmosphere, with stirring, with 300 mg. of potassium hydroxide dissolved in 1 cc. of water and 5 cc. of methanol and the mixture stirred at 0° C. for 1 hour. The resulting solution was neutralized with acetic acid, diluted with water and the crystalline compound, 16α,17α-isopropylenedioxy-$\Delta^5$-pregnene-3β,21-diol-20-one collected by filtration, water-washed, dried and then selectively acetylated at C-21, treating it with 1.1 molecular equivalents of acetic anhydride in pyridine at 0° C. and overnight. Conventional isolation techniques yielded 16α,17α-isopropylidenedioxy-$\Delta^5$-pregnene-3β,21-diol-20-one 21-acetate. This compound was then submitted to the lead tetraacetate-hydrogen fluoride treatment, followed by oxidation and finally to sodium-acetate treatment, exactly as described in Example I. Thus there were obtained consecutively: 5α,6α-difluoro-16α,17α-isopropylidenedioxy-pregnane-3β,21-diol-20-one, 5α,6α-difluoro-16α,17α-isopropylidenedioxy-pregnan-21-ol-3,20-dione acetate (which exhibited anti-androgenic activity) and 6α-fluoro-16α,17α-isopropylidenedioxy-$\Delta^4$-pregnen-21-ol acetate.

Upon hydrolysis of the latter compound with 60% formic acid followed by saponification there was formed 5α,6α-difluoro-pregnane-3β,16α,17α,21-tetrol-20-one, 5α,6α-difluoro-pregnane-16α,17α,21-triol - 3,20 - dione and 6α-fluoro-Δ⁴-pregnene-16α,17α,21-triol-3,20 - dione. Conventional esterification with acetic anhydride in pyridine solution at room temperature afforded the corresponding 16α,21-diacetate.

*Example XX*

10 g. of 16α-methyl-Δ⁵-pregnene-3β,17α-diol-20-one (Example IV) was dissolved in 50 ml. of methylene chloride. The solution was chilled to 10° C. and 9.6 g. of bromine, dissolved in 24 ml. of methylene chloride was added over a period of 20 minutes, while stirring and maintaining the temperature at 15° C. Water was then added, the organic layer separated, washed with water, dried over anhydrous sodium sulfate and evaporated to dryness, at reduced pressure at an inside temperature of less than 50° C. The residue consisted in the 16α-methyl-5α,6β,21-tribromo-pregnane-3β,17α-diol-20-one.

To a solution of the foregoing tribromo compound in 200 ml. of acetone, 40 g. of sodium iodide was added and the mixture was stirred for 15 minutes and then left at room temperature overnight. Water was added, the product was extracted with methylene chloride and the extract was washed consecutively with aqueous 3% sodium thiosulfate and water. It was then dried over anhydrous sodium sulfate, filtered and the filtrate was concentrated at reduced pressure, from a water-bath heated to 40° C. After cooling the precipitate was filtered, water-washed and dried in vacuo affording 16α-methyl-21-iodo-Δ⁵-pregnene-3β,17α-diol-20-one. This compound was refluxed with 45 g. of potassium acetate in 300 ml. of acetone for 14 hours. The mixture was then concentrated to a small volume, cooled, diluted with water and extracted with ether. The extract was washed with water dried over sodium sulfate and concentrated to small volume. Upon cooling, 16α-methyl-Δ⁵-pregnene-3β,17α,21-triol-20 - one 21-acetate precipitated in crystalline form and was collected by filtration, water-washed and dried.

By the method described in Example I, the above compound was treated with lead tetraacetate and hydrogen fluoride to yield 16α-methyl-5α,6α-difluoro-pregnane-3β,17α,21-triol-20-one 21-acetate. In accordance with said example it was oxidized to 16α-methyl-5α-difluoro-pregnane-17,21-diol-3,20-dione 21-acetate. Finally by refluxing with sodium acetate in methanol (cf. Example I) 16α-methyl-6α-fluoro-Δ⁴-pregnene-17α,21-diol-3,20 - dione 21-acetate was produced.

*Example XXI*

By the method described in Example I, 5 g. of Δ⁵-pregnene-3β,17α,21-triol-11,20-dione [Rothman and Wall, J. Am. Chem. Soc., 81, 481 (1959)] was treated with lead tetraacetate and hydrogen fluoride and there was finally obtained 5α,6α-difluoro-pregnane-3β,17α,21-triol - 11,20-dione.

Following the technique described in Example I, this compound was oxidized to 5α,6α-difluoro-pregnane-17α,21-diol-3,11,20-trione, identical with the intermediate obtained in Example XVI.

*Example XXII*

5 g. of Δ⁵-pregnene-3β,17α,21-triol-11,20-dione acetate were hydrolyzed to the free alcohol and the 20-semicarbazone was then formed. The latter was treated with lithium aluminum hydride, the 20-keto group was regenerated by known methods and thus Δ⁵-pregnene-3β,11β,17α,21-tetrol-20-one was obtained, which was selectively acetylated at C-21 by reaction with 1 equivalent of acetic anhydride in pyridine at 5° C. during 4 hours. Then the lead tetraacetate-hydrogen fluoride reaction as described in Example I was employed to give 5α,6α-difluoro-pregnane-3β,11β,17α,21-tetrol-20-one-21 - acetate. Subsequent oxidation with 8 N chromic acid afforded 5α,6α-difluoro-pregnane-17α,21-diol-3,11,20-trione 21-acetate identical with the intermediate of Example XVI.

*Example XXIII*

A solution of 5 g. of Δ⁵-androstene-3β,17β-diol, in 100 ml. of methylene chloride was added to a mixture of 10 g. of lead tetraacetate and 20 ml. of anhydrous hydrogen fluoride mixture which had been previously chilled to —80°, in a Dry Ice-acetone bath. The solution of the steroid was added over 15 minutes with stirring, and was then stirred for additional 15 minutes, at —80° C. At the end of this time the mixture was cautiously poured into an ice-cold solution of sodium carbonate in water, containing an excess of sodium carbonate. The organic phase was separated, the aqueous phase extracted with methylene chloride, the cooled methylene chloride solutions were washed with water to neutrality, dried over anhydrous sodium sulfate and evaporated to dryness. The residue was chromatographed over neutral alumina to afford 5α,6α-difluoro-androstane-3β,17β-diol which exhibited anti-estrogenic activity.

An ice-cold solution of 5 g. of the foregoing compound, in 250 ml. of acetone, was treated with an excess of 8 N chromic acid, with stirring. The 8 N chromic acid was prepared in aqueous dilute sulfuric acid. The temperature was maintained at 0° during the addition. The mixture was then stirred, under the same conditions, for 2 minutes more. At the end of this time it was poured into ice-water, the solid was filtered, washed with water, dried, and crystallized from acetone-hexane. Thus 5α,6α-difluoro-androstane-3,17-dione was obtained.

A mixture of 5 g. of the above compound, 5 g. of sodium acetate and 150 ml. of methanol was refluxed for 2 hours; at the end of this time, it was diluted with an excess of water. The product was filtered, washed with water, dried and crystallized from acetone-hexane, affording 6α-fluoro-Δ⁴-androstene-3,17-dione.

*Example XXIV*

Exactly as described in Example XXIII, 17α-methyl-Δ⁵-androstene-3β,17β-diol was treated with lead tetraacetate and hydrogen fluoride. 17α-methyl-5α,6α-difluoro-androstane-3β,17β-diol was produced; the subsequent 8 N chromic acid oxidation yielded 17α-methyl-5α,6α-difluoro-androstan-17β-ol-3-one; finally, by refluxing the foregoing compound with sodium acetate, 17α-methyl-6α-fluoro-testosterone was produced.

*Example XXV*

By the reaction described in Example XXIII, from 17α-ethyl-Δ⁵-androstene-3β,17β-diol were produced consecutively: 17α-ethyl - 5α,6α - difluoro-androstane-3β,17β-diol, 17α-ethyl-5α,6α-difluoro-androstan-17β-ol-3-one and 17α-ethyl-6α-fluoro-testosterone.

*Example XXVI*

By the reactions described in Example XXIII, from 17α-ethinyl-Δ⁵-androstene-3β,17β-diol were produced consecutively: 17α-ethinyl-5α,6α-difluoro-androstane-3β,17β-diol, and 17α-ethinyl-5α,6α-difluoro-androstan-17β-ol-3-one; both compounds exhibited anti-androgenic activity.

*Example XXVII*

The procedure of Examples XXIII and XXIV was repeated but using lead dioxide instead of lead tetraacetate to produce the intermediates 5α,6α-difluoro-androstane-3β,17β-diol and 17α-methyl-5α,6α-difluoro-androstane-3β,17β-diol, respectively.

*Example XXVIII*

5 g. of 19-nor-Δ⁵-androstene-3β,17β-diol [Hartman, J. Am. Chem. Soc., 77, 5151 (1955)] was submitted to the reactions described in Example XXIII. Thus were obtained, consecutively: 5α,6α-difluoro-19-nor-androstane-3β,17β-diol, 5α,6α-difluoro-19-nor-androstane - 3,17-dione and 6α-fluoro-19-nor-Δ⁴-androstene-3,17-dione.

Example XXIX

17α-methyl-19-nor - Δ⁵ - androstene-3β,17β-diol [Iriarte et al., J. Am. Chem. Soc. 81, 436 (1959)] was submitted to the reactions described in Example XXIII. Thus there were obtained, consecutively: 17α-methyl-5α,6α-difluoro-19-nor-androstane-3β,17β-diol, 17α-methyl-5α,6α-difluoro-19-nor-androstan-17β-ol-3-one and 17α-methyl-6α-fluoro-19-nor-testosterone.

Example XXX

17α-ethyl - 19 - nor - Δ⁵-androstene-3β,17β-diol [Iriarte et al., J. Am. Chem. Soc., 81, 436 (1959)] was submitted to the reactions described in Example XXIII. Thus there were obtained, consecutively: 17α-ethyl-5α,6α-difluoro-19-nor-androstane-3β,17β-diol, 17α-ethyl-5α,6α-difluoro-19-nor-androstan-17β-ol-3-one and 17α-ethyl-6α-fluoro-19-nor-testosterone; these compounds exhibited anabolic activity.

Example XXXI

17α-ethinyl-19-nor-Δ⁵-androstene - 3β,17β - diol [Iriarte et al., J. Am. Chem. Soc., 81, 436 (1959)] was submitted to the reactions described in Example XXVII. Thus were obtained, consecutively: 17α-ethinyl-5α,6α-difluoro-19-nor-androstane-3β,17β-diol, 17α-ethinyl-5α,6α-difluoro-19-nor-androstan-17β-ol-3-one and 17α-ethinyl-6α-fluoro-19-nor-testosterone.

Example XXXII

The procedure of Example XXXI was repeated but using lead dioxide instead of lead tetraacetate and carbon tetrachloride, instead of methylene chloride to produce the intermediate 17α-ethinyl-5α,6α-difluoro-19-nor-androstane-3β,17β-diol.

Example XXXIII

A solution of 2 g. of 5α,6α-difluoro-pregnane-3,20-dione, intermediate of Example I, in 125 cc. of glacial acetic acid was treated with 5 cc. of concentrated hydrochloric acid (10 N) and the mixture heated at 70° C. for 1 hour. Addition of ice water, filtration of the product and crystallization from acetone hexane afforded 6α-fluoroprogesterone, identical with that obtained in Example I.

By the same method 5α,6α-difluoro-androstane-3,17-dione and 17α-methyl-5α,6α-difluoro-androstane-17β-ol-3-one were converted respectively into 6α-fluoro-Δ⁴-androstene-3,17-dione and 6α-fluoro-17α-methyl testosterone.

Example XXXIV

16β-methyl-Δ⁵-pregnen-3β-ol-20-one acetate described in Example XI was subjected to the method described in Example VIII for introduction of the hydroxyl group at C–17α. The thus formed 16β-methyl-Δ⁵-pregnene-3β,17α-diol-20-one was divided into 5 portions of 1 g. each and submitted to the reactions described in Example VI. Thus there were obtained 5α,6α-difluoro-16β-methylpregnane-3β,17α-diol-20-one, 5α,6α-difluoro-16β-methyl - pregnan-17α-ol-3,20-dione, and 6α-fluoro-16β-methyl-17α-hydroxy-progesterone and the 17-acetates, 17-propionates, 17-caproates, and 17-cyclopentylpropionates respectively of said compounds.

Example XXXV

16α-methyl-Δ⁵-pregnen-3β-ol-20 - one acetate [Marker et al., J. Am. Chem. Soc., 64, 1280 (1942)] was saponified by conventional alkaline hydrolysis to afford the C–3 alcohol. By applying the reactions described in Example I, there were obtained from 16α-methyl-Δ⁵-pregnen-3β-ol-20-one, consecutively: 5α,6α-difluoro-16α-methyl-pregnan-3β-ol-20-one; 6α,6α-difluoro - 16α - methyl-pregnane-3,20-dione and 6α-fluoro-16α-methyl-progesterone.

I claim:

1. A process for the preparation of 5α,6α-difluoro steroids selected from the group consisting of the following formulas:

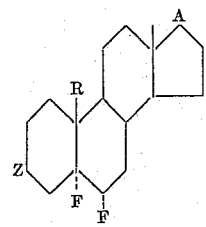

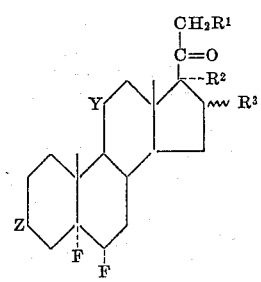

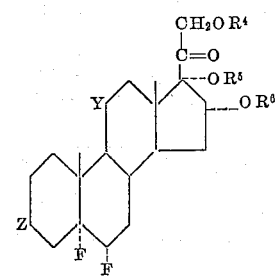

wherein R and R³ are selected from the group consisting of hydrogen and methyl, R¹ and R² are selected from the group consisting of hydrogen, hydroxyl and a hydrocarbon carboxylic acyloxy group of less than 12 carbon atoms, R⁴, R⁵ and R⁶ are selected from the group consisting of hydrogen and a hydrocarbon carboxylic acyl group of less than 12 carbon atoms, R⁵ and R⁶ together with the oxygen function represent the grouping.

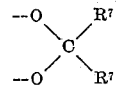

wherein R⁷ is selected from the group consisting of hydrogen and an aliphatic hydrocarbon radical of less than 8 carbon atoms, Y is selected from the group consisting of hydrogen, keto and β-hydroxyl; Z is selected from the group consisting of keto and β-hydroxy, and A is selected from the group consisting of keto

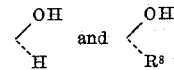

wherein R⁸ represents an aliphatic hydrocarbon radical containing up to 8 carbon atoms, comprising reacting the corresponding Δ⁵-3β-hydroxy compound with anhydrous hydrogen fluoride and a metallic reagent selected from the group consisting of lead tetraacetate, lead dioxide, osmium tetroxide and cobaltic oxide.

2. The process of claim 1, wherein lead tetraacetate is the metallic reagent.

3. The process of claim 1 wherein lead dioxide is the metallic reagent.

4. A process for the preparation of 5α,6α-difluoro steroids selected from the group consisting of the following formulas:

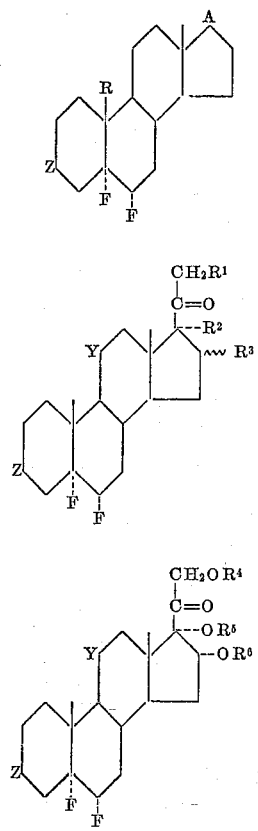

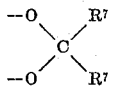

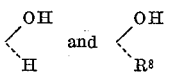

wherein R and R³ are selected from the group consisting of hydrogen and methyl, R¹ and R² are selected from the group consisting of hydrogen, hydroxyl and a hydrocarbon carboxylic acyloxy group of less than 12 carbon atoms, R⁴, R⁵ and R⁶ are selected from the group consisting of hydrogen and a hydrocarbon carboxylic acyl group of less than 12 carbon atoms, R⁵ and R⁶ together with the oxygen function represent the grouping $$\begin{array}{c} -O \\ -O \end{array} C \begin{array}{c} R^7 \\ R^7 \end{array}$$

wherein R⁷ is selected from the group consisting of hydrogen and an aliphatic hydrocarbon radical of less than 8 carbon atoms, Y is selected from the group consisting of hydrogen, keto and β-hydroxyl; Z is selected from the group consisting of keto and β-hydroxyl and A is selected from the group consisting of keto, $$\begin{array}{cc} \diagdown OH & \diagdown OH \\ \diagup & \text{and} \diagup \\ H & R^8 \end{array}$$

wherein R⁸ represents an aliphatic hydrocarbon radical containing up to 8 carbon atoms, comprising reacting the corresponding Δ⁵-3β-hydroxy compound with anhydrous hydrogen fluoride and lead tetraacetate at a temperature ranging from —80° C. to —10° C. in an inert solvent.

5. The process of claim 4 wherein the reaction is effected at —80° C.

6. The process of claim 4 wherein the reaction is effected in methylene chloride.

7. A process for the preparation of 5α,6α-difluoro steroids selected from the group consisting of the following formulas:

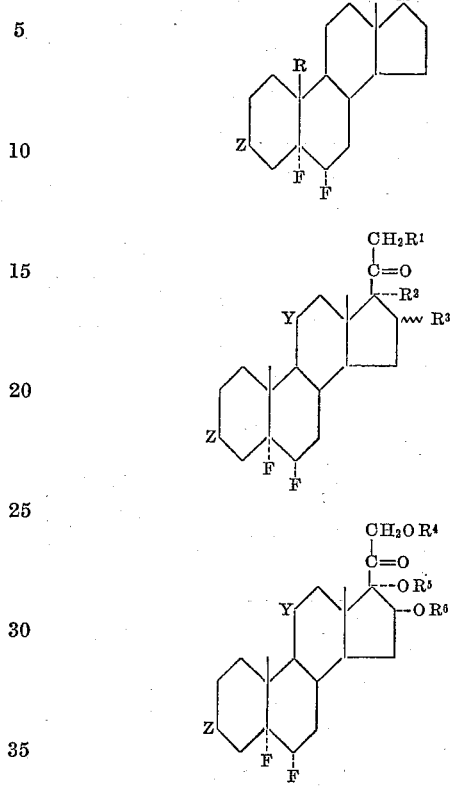

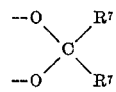

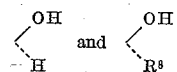

wherein R and R³ are selected from the group consisting of hydrogen and methyl, R¹ and R² are selected from the group consisting of hydrogen, hydroxyl and a hydrocarbon carboxylic acyloxy group of less than 12 carbon atoms, R⁴, R⁵ and R⁶ are selected from the group consisting of hydrogen and a hydrocarbon carboxylic acyl group of less than 12 carbon atoms, R⁵ and R⁶ together with the oxygen function represent the grouping $$\begin{array}{c} -O \\ -O \end{array} C \begin{array}{c} R^7 \\ R^7 \end{array}$$

wherein R⁷ is selected from the group consisting of hydrogen and an aliphatic hydrocarbon radical of less than 8 carbon atoms, Y is selected from the group consisting of hydrogen, keto and β-hydroxyl; Z is selected from the group consisting of keto and β-hydroxy and A is selected from the group consisting of keto, $$\begin{array}{cc} \diagdown OH & \diagdown OH \\ \diagup & \text{and} \diagup \\ H & R^8 \end{array}$$

wherein R⁸ represents an aliphatic hydrocarbon radical containing up to 8 carbon atoms, comprising reacting the corresponding Δ⁵-3β-hydroxy compound with anhydrous hydrogen fluoride and lead dioxide at a temperature ranging from —80° C. to —10° C. in an inert solvent.

8. A process for the production of a 5α,6α-difluoro androstane of the following formula:

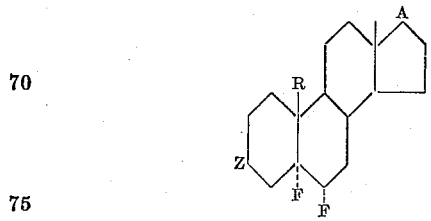

wherein R is selected from the group consisting of hydrogen and methyl, Z is selected from the group of keto and β-hydroxy and A is selected from the group consisting of keto,

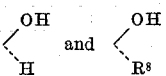

wherein R⁸ represents an aliphatic hydrocarbon radical containing up to 8 carbon atoms, comprising reacting the corresponding Δ⁵-3β-hydroxy-androstene with anhydrous hydrogen fluoride and lead tetraacetate in an inert solvent at −80° C. to −10° C.

9. The process of claim 8 wherein the reaction is effected at −80° C.

10. A compound of the following formula:

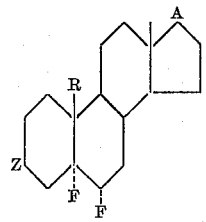

wherein R is selected from the group consisting of hydrogen and methyl; A is selected from the group consisting of keto and

in which R⁷ is selected from the group consisting of hydrogen and an aliphatic hydrocarbon radical of less than 8 carbon atoms; and Z is selected from the group consisting of keto and β-hydroxy.

11. 5α,6α-difluoro-androstane-3β,17β-diol.
12. 17α - ethyl-5α,6α-difluoro-19-nor-androstan-17β-ol-3-one.
13. 17α - ethinyl - 5α,6α - difluoro-androstan-17β-ol-3-one.
14. 5α,6α-difluoro-androstane-3,17-dione.
15. 5α,6α-difluoro-pregnane-3,20-dione.
16. 5α,6α - difluoro-pregnane-17α-ol-3,20-dione 17-propionate.
17. 5α,6α - difluoro - 16α - methyl-pregnan-17α-ol-3,20-dione 17-acetate.
18. 5α,6α - difluoro - pregnan - 17α - ol - 3,11,20-trione.
19. 5α,6α - difluoro - 16β - methyl-pregnane-3β,11α,17α-triol-20-one.
20. 5α,6α - difluoro - pregnane-17α,21-diol-3,11,20-trione 21-acetate.

21. A compound of the following formula:

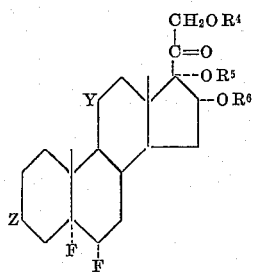

wherein R⁴, R⁵ and R⁶ are each selected from the group consisting of hydrogen and a hydrocarbon carboxylic acyl radical of less than 12 carbon atoms, Y is selected from the group consisting of hydrogen, keto and hydroxy and Z is selected from the group consisting of keto and β-hydroxy.

22. 5α,6α - difluoro - pregnane-3β,16α,17α,21-tetrol-20-one.

23. A compound of the following formula:

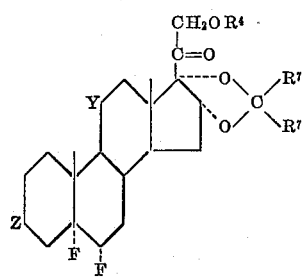

wherein R⁴ is selected from the group consisting of hydrogen and a hydrocarbon carboxylic acyl radical of less than 12 carbon atoms; R⁷ is selected from the group consisting of hydrogen and an aliphatic hydrocarbon of less than eight carbon atoms; Y is selected from the group consisting of hydrogen, keto and hydroxy and Z is selected from the group consisting of keto and β-hydroxy.

24. 5α,6α - difluoro - 16α,17α - isopropylidenedioxy-pregnan-21-ol-3,20-dione 21-acetate.

25. A process for the production of 5α,6α-difluoro-pregnane selected from the group consisting of those of the following formulas:

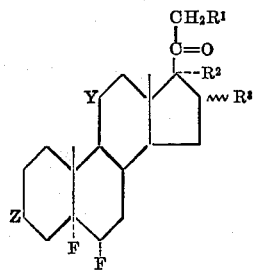

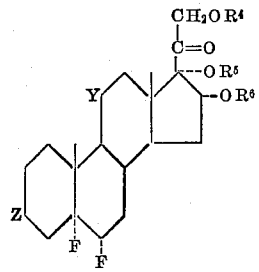

wherein R³ is selected from the group consisting of hydrogen and methyl; R¹ and R² are selected from the group consisting of hydrogen, hydroxyl and a hydrocarbon carboxylic acyloxy group of less than 12 carbon atoms, R⁴, R⁵ and R⁶ are selected from the group consisting of hydrogen and a hydrocarbon carboxylic acyl group of less than 12 carbon atoms, R⁵ and R⁶ together with the oxygen function represent the grouping

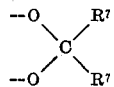

wherein $R^7$ is selected from the group consisting of hydrogen and an aliphatic hydrocarbon radical of less than 8 carbon atoms, Y is selected from the group consisting of hydrogen, keto and β-hydroxyl; Z is selected from the group consisting of keto and β-hydroxy, comprising reacting the corresponding $\Delta^5$-3β-hydroxy-pregnene with anhydrous hydrogen fluoride and lead tetraacetate in an inert solvent at —80° C. to —10° C.

26. The process of claim 25 wherein the reaction is effected at —80° C.

References Cited in the file of this patent

UNITED STATES PATENTS

| | | |
|---|---|---|
| 2,175,220 | Schoeller et al. | Oct. 10, 1939 |
| 2,184,299 | Hildebrandt | Dec. 26, 1939 |
| 2,430,988 | Marker et al. | Nov. 18, 1947 |
| 2,811,522 | Cutler | Oct. 29, 1957 |

OTHER REFERENCES

Cutler et al.: J. O. C., vol. 80, Dec. 29, 1959, pages 1621–25.